J. E. JONES AND J. E. WILLIS.
SCREW BAR NUT.
APPLICATION FILED MAR. 29, 1918.
1,325,892.
Patented Dec. 23, 1919.
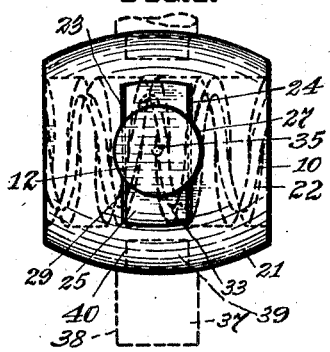
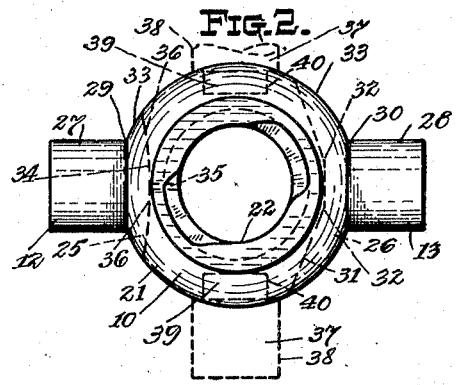
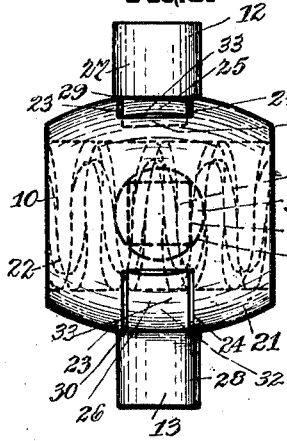
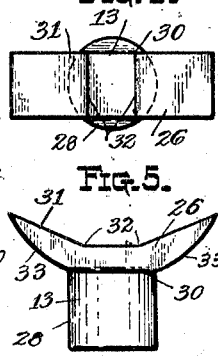
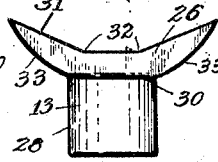
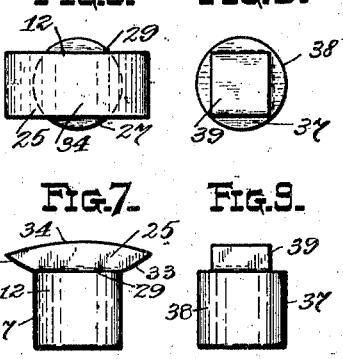
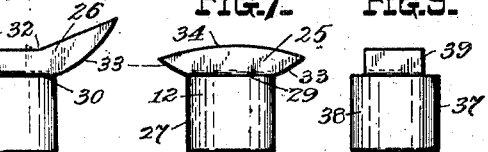
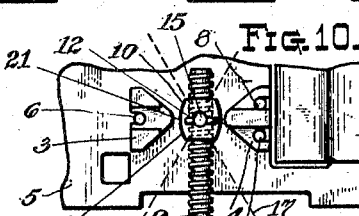
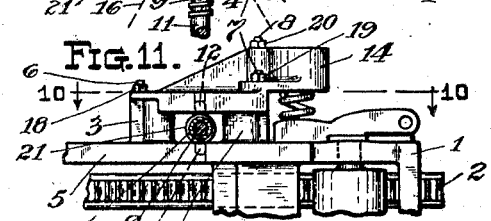
JOSEPH E. JONES,
JOHN E. WILLIS,
INVENTORS.
BY William A. Hirtle
ATTORNEY.

UNITED STATES PATENT OFFICE.

JOSEPH E. JONES AND JOHN E. WILLIS, OF BANNING, PENNSYLVANIA.

SCREW-BAR NUT.

1,325,892.  Specification of Letters Patent.  Patented Dec. 23, 1919.

Application filed March 29, 1918. Serial No. 225,578.

*To all whom it may concern:*

Be it known that we, JOSEPH E. JONES and JOHN E. WILLIS, citizens of the United States of America, residing at Banning, in the county of Fayette and State of Pennsylvania, have invented certain new and useful Improvements in Screw-Bar Nuts, of which the following is a specification.

The present invention relates to improvements in screw bar nuts for coke drawing machines commonly called coke extractors, and has for its object the provision of a type of screw bar nut having removable steel trunnions, the use of which increases the life of the bronze nuts in common use for the purpose mentioned. A further object of the invention is to provide substitute removable lugs, which take the place of the regular trunnions, when the latter become broken from any cause, by using the same bronze nut body in connection with said substitute lugs, as will be further explained in this specification.

In the accompanying drawings forming part of this specification we have shown one complete example of the physical embodiment of our invention, constructed according to the best mode we have so far devised for the practical application of the principles of the invention.

Figure 1 is a top plan view in detail of our improved screw bar nut for coke extractors.

Fig. 2 is an end view of the same.

Fig. 3 is a side elevational view of Fig. 1.

Fig. 4 is a plan view of the bottom removable lug or trunnion shown in Fig. 3, and used with our invention.

Fig. 5 is a side view of Fig. 4.

Fig. 6 is a plan view of the top removable trunnion shown in Fig. 3.

Fig. 7 is a side view of the same.

Fig. 8 is a plan view of a substitute form of lug, shown dotted in Figs. 1, 2 and 3 of the drawings.

Fig. 9 is a side view of the same.

Fig. 10 is a plan view on line 10—10 of Fig. 11, showing a portion of a ram carriage of a coke extractor.

Fig. 11 is a side elevation of Fig. 10.

The numeral 1 indicates a portion of the ram carriage of a coke extractor or coke drawing machine used for withdrawing coke from the ordinary bee-hive coke ovens. 2 indicates the ram bar which operates longitudinally back and forth within the ram carriage 1 for the purpose of operating the shovel (not shown) of the coke extractor. 3 and 4 represent two upstanding projections or bosses formed integrally on the top 5 of the ram carriage 1, and having the bolts 6, 7 and 8 protuding therefrom as shown. 9 represents the screw bar of the coke extractor which operates within the screw bar nut 10 to operate the ram carriage 1, the end 11 of the said screw bar being operated by a motor (not shown). The screw bar nut 10 is provided with two diametrically opposed trunnions 12, 13 which are journaled in the top 5 of the ram carriage and in the cap plate 14. The screw bar nut 10 it is seen rotates laterally about the point 15 so that the screw bar 9 can take various positions like those suggested by the dotted lines 16, 17 in the Fig. 10. The cap plate 14 is held in position by the nuts 18, 19, 20 on the bolts 6, 7 and 8, and said cap plate also secures the screw bar nut in position as is readily appreciated. It is evident that the trunnions 12 and 13 of the screw bar nut 10 are required to hold the latter against vertical rotation when the screw bar 9 is operated and this is accomplished under the present practice by making the trunnions 12 and 13 integral with the body portion 21 of the nut 10. It is the practice also to make the nut 10 and the trunnions 12 and 13 of bronze or similar metal, and as there is a great strain on the threads of the screw bar and nut, due to the inertia of the heavy ram carriage to be overcome, and the difficulty in keeping the screw bar 9 horizontal and parallel with the top of the ram carriage top 5, the integral bronze trunnions 12 and 13 soon crack and break off from the body 21 of the screw bar nut 10, thus making it necessary to constantly replace the expensive screw bar nuts by new ones. In order to overcome the disadvantage stated with respect to nuts having integral trunnions, we have provided a new type of screw bar nut shown in detail in Figs. 1 to 9 of the drawings. The body portion 21 is made of bronze and the usual heavy threaded bore 22 passing longitudinally through the nut is provided similar to the standard nuts used for this purpose. The trunnions 12, 13 however in our new form of nut are removable and the top or upper trunnion 12 is made of different construction from the lower or bottom trunnion 13 as will be described. Considerable play or space is maintained along the sides 23, 24 of the tongues 25, 26 of the said trunnions, so that as the threads of the screw bar 9, and the nut 10 become worn in service, and the screw bar no longer operates in a truly horizontal position parallel with the top surface of the ram carriage 1, the journaled portions 27, 28 of the nuts 12, 13 will not be broken at points 29, and 30. Furthermore, as we prefer to make the removable trunnions 12, 13 of steel forgings, in contrast with the bronze portion 21 of the nut 10, it is seen that the life of the nut as a whole is increased, in that the weakest points of the nut are strengthened by using metal having the necessary strength at the points 29 and 30.

To provide against the vertical rotation of the nut body 21 when the screw bar operates within the same, we have formed the inner flat bearing surfaces 31 of the lower trunnion 13 angular in outline as seen in Fig. 5 at points 32, which prevents such vertical rotation of the nut 10. The outer surfaces 33 of the tongues 25, 26 are made flush with the outer convex surfaces of the body of the nut 10. The upper trunnion 12 has an inner flat bearing surface 34 curved as shown in Fig. 7, for a purpose stated below. For the purpose of oiling the screw bar 9, a passage 35 is provided connecting the recess 36 and the bore 22 of the nut 10, and the lubricant flows over the top and sides of the trunnion 12, into the recess 36, and thence through the passage 35 to the screw bar 9.

It is seen that in cases of emergency substitute lugs 37 having journaled portions 38, and square or rectangular tongues 39 can be inserted in complementary recesses 40 formed in the nuts 10 in a circumferential diametrically opposed position as shown dotted in Fig. 2 substantially at right angles with the center line of the lugs 12 and 13.

It is to be noted that two trunnions of the type 13 can be used if desired instead of the combination of the types 12 and 13 by merely changing the shape of the recess 36 in the nut 10. The screw bar nut 10 is closely held between the top 5 of the ram carriage 1 and the cap plate 1, so that the fact that the trunnions 12, 13 are loosely fitted in their recesses is not a matter of importance so far as the security of position of the nut 10 is concerned, and this permits the use of removable trunnions which form the subject of the present invention.

Attention is called to the fact that many of the discarded bronze nuts at present "scrapped" as of no further use due to the breakage of the trunnions, can be refitted with our type of trunnions and readily placed back in service on the coke extractors.

From the above description it is seen that we have provided a screw bar nut for coke extractors possessing the advantages above set forth.

What we claim is:—

1. A screw bar nut having a threaded bore, and a pair of diametrically opposed removable trunnions adapted to be rotatably mounted in bearings on a ram carriage.

2. A screw bar nut having a pair of diametrically opposed circumferential recesses formed in its outer surface, a pair of detachable trunnions loosely mounted in said nut recesses, and forming journals for rotatably supporting the screw bar nut in bearings on a ram carriage.

3. A screw bar nut having a pair of peripheral recesses formed therein, a lower removable trunnion having a journaled end, and a pair of oppositely disposed prongs with an angular shaped inner bearing surface engaging one of the said peripheral recesses; and an upper removable trunnion having a journaled end, and a pair of oppositely disposed prongs with an upwardly curved inner bearing surface engaging the other peripheral recess of the said screw bar nut.

4. In a device of the class described, a removable trunnion provided with a cylindrical portion forming a journal and a tongue portion having an angular inner bearing surface, and a pair of oppositely disposed curved prongs.

5. In a device of the class described a removable trunnion provided with a cylindrical journaled end, and a tongue having an arc shaped inner bearing surface, and a pair of opposed curved prongs.

6. A screw bar nut comprising a nut having a screw threaded bore and also having a pair of peripheral recesses having angular bearing surfaces, formed in the body of the nut, and a pair of removable trunnions, each provided with a journaled end, and a tongue comprising a pair of oppositely disposed prongs with angular shaped inner bearing surfaces adapted to engage in the aforesaid complementary recesses of the nut.

7. A screw bar nut having a pair of peripheral angular recesses, a pair of removable trunnions each having a tongue with opposed angular prongs adapted to engage the said complementary angular recesses; a pair of substitute removable trunnions, each having a journaled end and a cubical tongue; and a pair of peripheral recesses substantially at right angles with the first mentioned angular recesses, adapted to receive the tongues of the aforesaid substitute trunnions.

8. In a device of the class described in combination, a ram carriage having a pair of vertically disposed bearings thereon, a screw bar nut provided with a threaded bore, a pair of removable trunnions mounted on the periphery of the said nut, adapted to rotate in the vertically disposed bearings, and a screw bar engaging the threads of the screw bar nut for the purpose of operating the aforesaid ram carriage.

In testimony whereof we affix our signatures in the presence of two witnesses.

JOSEPH E. JONES.
JOHN E. WILLIS.

Witnesses:
JAMES J. MARSHALL,
WILLIAM A. HIRTLE.